Jan. 29, 1957 A. A. CHUBB ET AL 2,779,821

AUTOMATIC TELEPHONE SYSTEMS

Filed Feb. 14, 1952 2 Sheets-Sheet 1

INVENTORS
ALEXANDER ALBERT CHUBB
MAURICE MOISE LEVY
BY
[signature]
ATTORNEY

Jan. 29, 1957

A. A. CHUBB ET AL 2,779,821

AUTOMATIC TELEPHONE SYSTEMS

Filed Feb. 14, 1952

2 Sheets-Sheet 2

INVENTORS
ALEXANDER ALBERT CHUBB
MAURICE MOISE LEVY
BY

ATTORNEY 2,779,821

AUTOMATIC TELEPHONE SYSTEMS

Alexander Albert Chubb, Coventry, England, and Maurice Moise Levy, Ottawa, Ontario, Canada, assignors to The General Electric Company Limited, London, England Application February 14, 1952, Serial No. 271,534

Claims priority, application Great Britain February 16, 1951

9 Claims. (Cl. 179—18)

The present invention relates to automatic exchanges in which a plurality of communication channels is provided by means of a plurality of time interlaced pulse trains, and, in operation, when establishing communication between two stations connected to the exchange, apparatus associated with a first station selects a free channel terminaitng unit, a signal is transmitted to automatic switching apparatus associated with the second station identifying the selected channel, and the said automatic switching apparatus connects the second station to the identified free channel. Such automatic exchanges will be referred to hereinafter as "automatic exchanges of the kind specified" and examples of such exchanges are disclosed in co-pending U. S. patent applications Nos. 247,072 filed the 18th September 1951, 257,786 filed the 23rd November 1951 and 257,991 and 257,992 filed the 24th November 1951.

The present invention is concerned to provide a suitable channel terminating unit for use in an automatic exchange of the kind specified.

According to the present invention a channel terminating unit for use in a automatic exchange of the kind specified, comprises means for applying impulses to a first output terminal for connection to a register in response to the application of impulses to a first input terminal, a second input terminal for connection to a source of gating pulses, two gate devices, connections between the second input terminal and the two gate devices to cause the gate devices to open only when gating pulses appear at the second input terminal, means for applying speech or other signals from the first input terminal through one of the gate devices to a second output terminal, means for applying pulses appearing at a third input terminal to the second gate device to be gated by the said gating pulses, and a pulse demodulator connected between the output of the second gate device and the first input terminal.

The invention will now be described by way of example with reference to the accompanying drawing in which—

Figure 1 is a block schematic diagram of an automatic telephone exchange which is fully described in the specification of co-pending patent application No. 257,786 filed November 23, 1951. This exchange will not therefore be fully described in the present specification.

Figure 1:
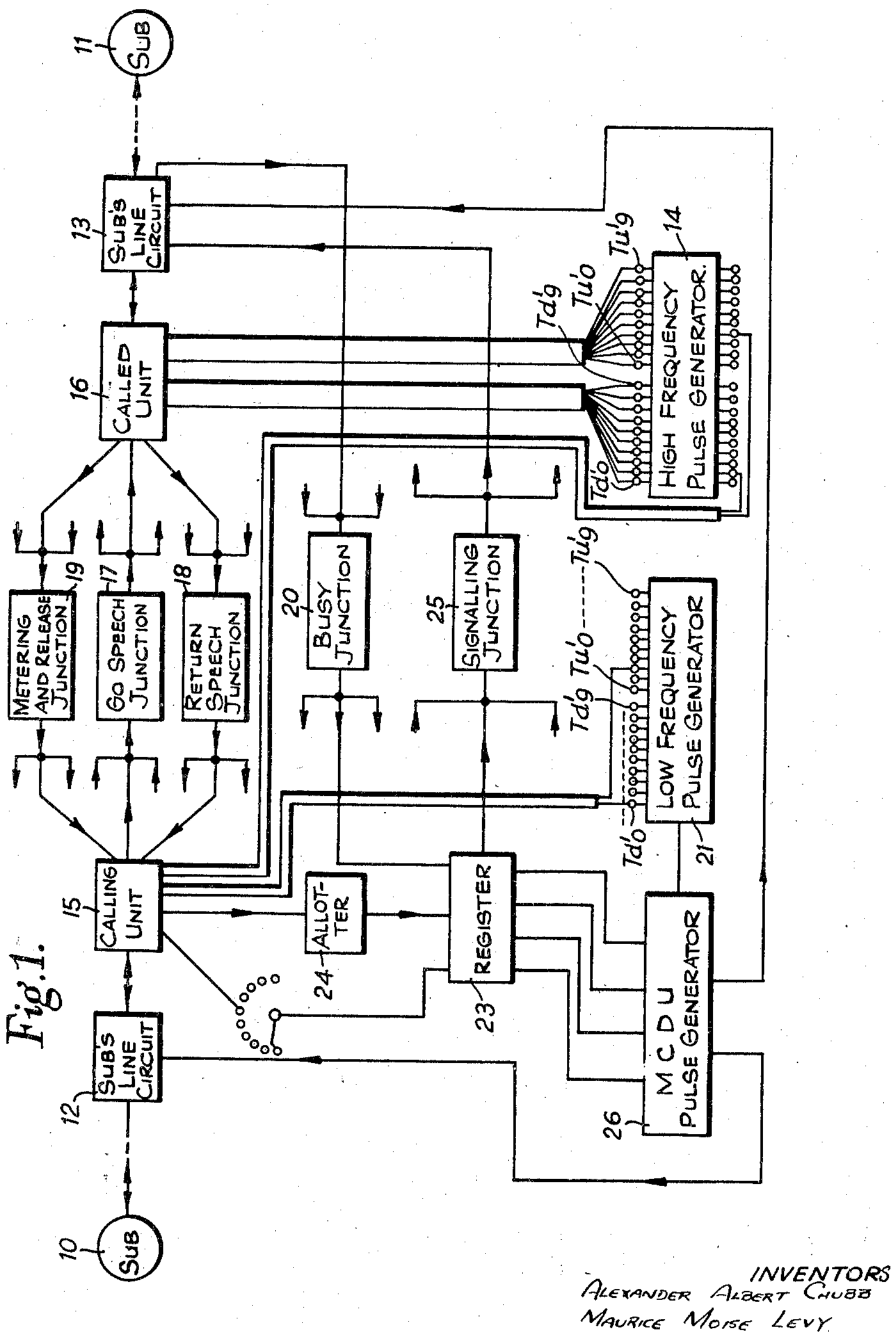
Figure 1 is a block schematic diagram of an automatic telephone exchange of the kind specified embodying a channel terminating unit according to the present invention.

The telephone exchange shown in Figure 1 is suitable for use with 2000 subscribers. Of the 2000 subscribers stations connected to the exchange, one is shown at 10 and another at 11, the station 10 being terminated in the exchange at "subscribers line circuit" 12 and the station 11 being terminated at the "subscribers line circuit" 13.

The exchange comprises a group of 100 pulse communication channels the pulses in each channel having a recurrence frequency of about 8,000 P. P. S. This group of channels is provided by means including a pulse generator 14 adapted to generate pulses suitable for combination to provide the 100 channels time-interlaced at the pulse repetition frequency of 8,000 P. P. S. in each channel. The 100 channels are terminated by 100 "calling units" respectively of which one is shown at 15. 100 "called units" terminate the other ends of the channels respectively when in use, one of the "called units" being shown at 16. Messages between the calling and called units pass through a "go speech junction" 17, a "return speech junction" 18 or a "metering and release junction" 19 as the case may be. In the event of a called subscriber being engaged a "busy signal" is transmitted to the calling subscriber by way of a "busy junction" 20.

For use in establishing calls between subscribers, a number of allotters 24 and registers 23 are provided together with a signalling junction 25 and two further pulse generators 21 and 26.

Assuming the subscriber at the station 10 to be calling the subscriber at the station 11 the first operation occurs in the subscribers line circuit 12. This contains a finder which finds a free calling unit 15. An allotter 24 then comes into operation and allots a register 23 to the calling unit 15.

By means of the allotter and a finder in the register the calling unit found by the subscribers line circuit 12 is connected to the allotted register 23. A dialling tone is then automatically transmitted to the calling subscriber.

The output of the pulse generator 21 is in the form of a recurring sequence of 20 pulses which for convenience will be divided into groups of ten each. The first ten pulses in each sequence will be referred to collectively as the $d'$ pulses and the second ten as the $u'$ pulses. The ten $d'$ pulses will be referred to individually as the pulses $d'_0$ to $d'_9$ respectively and appear at the terminals $Td'_0$ to $Td_9$ respectively of the generator 21. The ten $u'$ pulses will be referred to individually as pulses $u'_0$ to $u'_9$ and appear at the terminals $Tu'_0$ to $Tu'_9$ respectively of the generator 21.

Each of the calling units 15 is connected to one of the terminals $Td'_0$ to $Td'_9$ and to one of the terminals $Tu'_0$ to $Tu'_9$ of the generator 21, different ones of the calling units being connected to different pairs of the terminals $Td'$ and $Tu'$. Thus each calling unit is identified by a different pair of $d'$ and $u'$ pulses and, as will be described later, the pair of $d'$ and $u'$ pulses identifying the calling unit, and hence the selected channel, is transmitted to the called subscribers line circuit to identify the high grade channel on which communication is to be established.

When the calling subscriber heads the dialling tone and dials the number of the called subscriber, the dialling pulses are transmitted through the line circuit 12 and the seized calling unit 15 to the allotted register 23. In the register the four sets of dialling pulses are stored on four uniselectors. Four groups of ten pulses each, which will be referred to as the M, C, D and U pulses, are applied to the four uniselectors in the register from the pulse generator 26. Thus the uniselectors in the register select one pulse from each of the four groups of recurring pulses applied thereto and it is arranged that these four selected pulses are combined to form a recurring output pulse which occurs in one recurring channel interval in a recurring sequence of 2,000 channel intervals. The sequence may recur for example at the rate of one per second and the 2,000 channels constitute a group of low grade signalling channels.

The recurring output pulse from the register is used as a gate pulse and permits the recurring pair of *d' u'* pulses identified with the seized calling unit to pass to a signalling junction 25 only in the low grade channel interval determined by the gating pulse.

The output from the signalling junction is applied to all subscribers line circuits. These circuits have gating pulses applied thereto however from the pulse generator 26, the gating pulses applied to each subscribers line circuit being in the channel whose number corresponds to the subscriber's number on the exchange. Thus the only subscribers line circuit to respond to a pair of *d' u'* pulses appearing at the output of the signalling junction is that one whose gating pulse corresponds to the number dialled.

The called subscribers line circuit then hunts for a free called unit and when a free called unit is found this unit functions to select appropriate pulses from the output of the generator 14 to enable the called subscriber to establish communication in the channel terminated by the seized calling unit. The calling unit forms the subject of the present invention and one embodiment thereof will now be described in more detail with reference to Figure 2.

Figure 2:
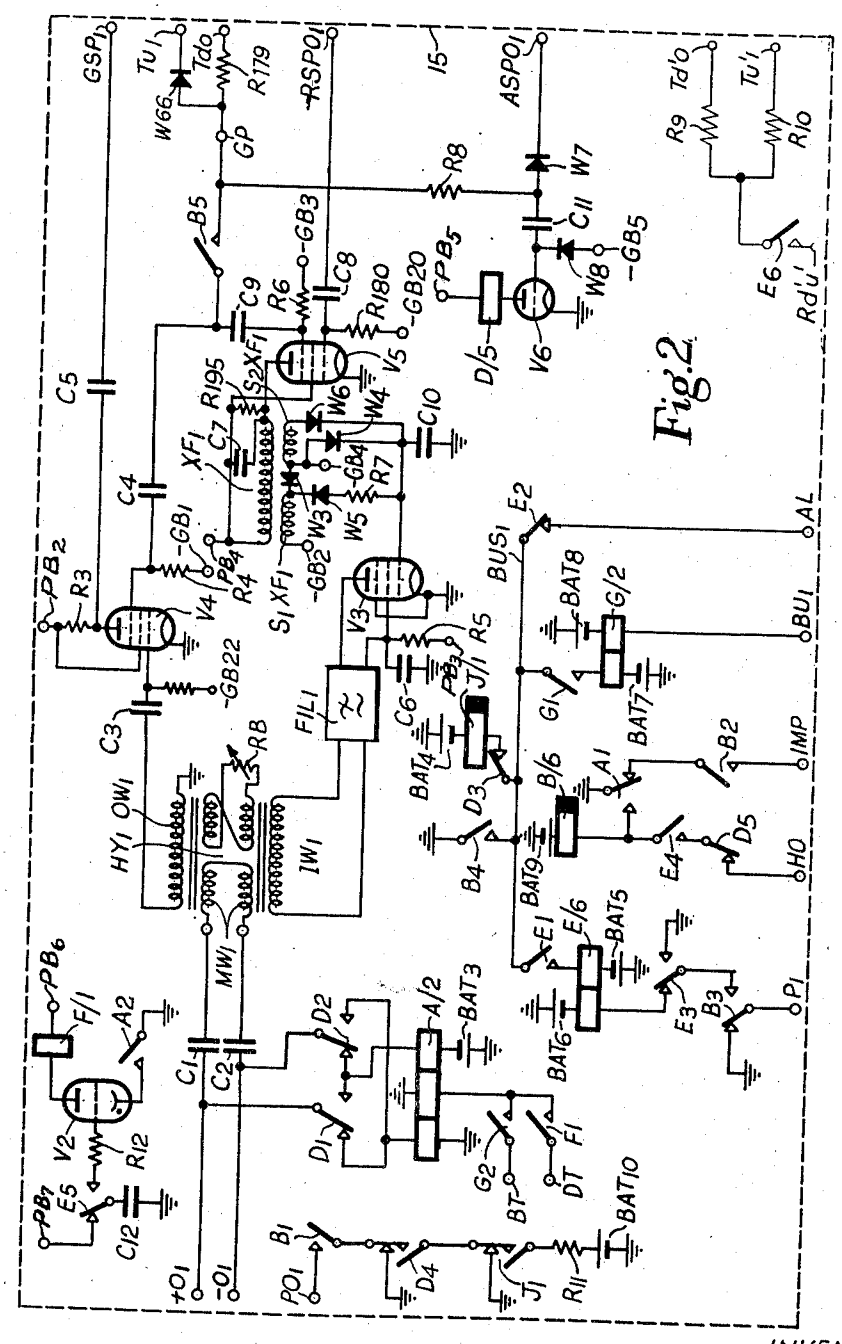
Figure 2 is a circuit diagram of one embodiment of the invention suitable for use in the automatic exchange of Figure 1.

In Figure 2 terminals $+O_1$, $-O_1$, and $PO_1$ are for connection to the subscribers line circuits of which two are shown in Figure 1, and the terminals $+O_1$ and $-O_1$ are extended through a subscribers line circuit when in use to the subscribers line. The terminal $+O_1$ is connected through relay contacts $D_1$ and one winding of relay A to earth. Terminal $-O_1$ is connected through relay contacts $D_2$, a second winding of relay A and a battery $BAT_3$ to earth. Terminals $+O_1$ and $-O_1$ are also connected through capacitors $C_1$ and $C_2$ respectively to a winding $MW_1$ of a hybrid transformer $HY_1$ which has a balancing resistor RB. The function of the hybrid transformer and balancing resistor is as described on page 83 vol. I of Telephony by Atkinson, published by Sir Isaac Pitman & Sons Ltd., London and New York.

The winding $OW_1$ of the hybrid transformer is connected through a capacitor $C_3$ to the control grid of a pentode valve $V_4$ whose anode is connected through a load resistor $R_3$ to the positive terminal $PB_2$ of a source (not shown) of D. C. whose negative terminal is earthed. The cathode of the valve $V_4$ is earthed, the screen grid is connected directly to the terminal $PB_2$, and the suppressor grid is connected through a resistor $R_4$ to the negative terminal $-GB_1$ of a bias source (not shown) whose positive terminal is earthed. The suppressor grid is also connected through a capacitor $C_4$ and relay contacts $B_5$ to a terminal GP. The anode of the valve $V_4$ is connected through a capacitor $C_5$ to a terminal $GSP_1$.

Winding $IW_1$ of the hybrid transformer $HY_1$ is connected to the output of a low-pass filter $FIL_1$. One input terminal of the filter is connected to the anode of a pentode valve $V_3$ and the other to earth through a capacitor $C_6$ and through a resistor $R_5$ to the positive terminal $PB_3$ of a source of D. C. (not shown). The suppressor grid and cathode of the valve $V_3$ are connected to earth.

A terminal $RSPO_1$ is connected through a capacitor $C_8$ to the control grid of a pentode valve $V_5$ whose cathode is earthed. Negative bias is applied to the control grid of the valve $V_5$ from the negative terminal $-GB_{20}$ of a bias source (not shown) whose positive terminal is earthed. The anode of the valve $V_5$ is connected through the primary winding of a transformer $XF_1$ to the positive terminal $PB_4$ of a source (not shown) of D. C. whose negative terminal is earthed. The screen grid of the valve $V_5$ is connected directly to the terminal $PB_4$ and the suppressor grid is connected through a resistor $R_6$ to the negative terminal $-GB_3$ of a bias source (not shown) whose positive terminal is earthed. The suppressor grid of the valve $V_5$ is also connected through a capacitor $C_9$ and the contacts $B_5$ to the terminal GP.

The transformer $XF_1$ has two secondary windings $S_1XF_1$ and $S_2XF_1$. One terminal of winding $S_1XF_1$, is connected to the negative terminal $-GB_2$ of a bias source (not shown) and the other terminal is connected through a rectifier $W_5$, and a resistor $R_7$ to the control grid of the pentode valve $V_3$ and is connected through a rectifier $W_3$ to the negative terminal $-GB_4$ of a bias source (not shown) whose positive terminal is earthed. One terminal of the winding $S_2XF_1$ is connected to the negative terminal $-GB_4$ and the other terminal of the winding $S_2XF_1$ is connected through a rectifier $W_6$ to the control grid of the valve $V_3$. The terminal $-GB_4$ is also connected to the control grid of $V_3$ through a rectifier $W_4$ and a capacitor $C_{10}$ is connected between the control grid of $V_3$ and earth.

A terminal $ASPO_1$ is connected through a rectifier $W_7$ and capacitor $C_{11}$ to the control grid of a triode valve $V_6$ whose cathode is earthed and whose anode is connected through a relay winding D to the positive terminal $PB_5$ of a D. C. source (not shown) whose negative terminal is earthed. The control grid of the valve $V_6$ is also connected through a rectifier $W_8$ to the negative terminal $-GB_5$ of a bias source (not shown) whose positive terminal is earthed. The junction of the capacitor $C_{11}$ and the rectifier $W_7$ is connected to the terminal GP through a resistor $R_8$.

A relay winding J has one terminal connected to earth through a battery $BAT_4$. The other terminal of the relay winding J is connected to earth through relay contacts $D_3$, a busbar $BUS_1$ and relay contacts $B_4$. The busbar is connected through relay contacts $E_1$, one winding of relay E and a battery $BAT_5$ to earth. A control terminal $P_1$ is connected either directly to earth or through the other winding of relay E and a battery $BAT_6$ to earth depending upon the setting of relay contacts $B_3$ and $E_3$. The busbar $BUS_1$ is connected through relay contacts $G_1$, one winding of a relay G and a battery $BAT_7$ to earth. The other winding of the relay G has one terminal connected to earth through a battery $BAT_8$, and has its other terminal connected directly to a terminal $BU_1$. The busbar is also connected through relay contacts $E_2$ to an output terminal AL.

Terminal HO is connected through relay contacts $D_5$, $E_4$ and $A_1$ to earth. A relay winding B has one terminal connected through contacts $A_1$ to earth and the other through a battery $BAT_9$ to earth. An output terminal IMP is connected through relay contacts $B_2$ and $A_1$ to earth.

Input terminals $Td'_0$ and $Tu'_1$ are connected together through resistors $R_9$ and $R_{10}$ and the junction of these two resistors is connected through relay contacts $E_6$ to an output terminal $Rd'u'$.

Terminal $PO_1$ is connected through relay contacts $B_1$ to relay contacts $D_4$ which depending upon their setting, provide either an earth connection or a connection to relay contacts $J_1$. The relay contacts $J_1$ provide either an earth connection or a connection through a resistor $R_{11}$ and a battery $BAT_{10}$ to earth.

The cathode of a gas-filled triode valve $V_2$ is connected to earth through relay contacts $A_2$ and its anode is connected through a relay winding F to the positive terminal $PB_6$ of a suitable source (not shown) of D. C. whose negative terminal is earthed. A capacitor $C_{12}$ is normally connected to the positive terminal $PB_7$ of a source (not shown) of D. C. whose negative terminal is earthed. The control grid of the valve $V_2$ is connected to the capacitor $C_{12}$ through a resistor $R_{12}$ and the contacts $E_5$.

A source (not shown) of busy tone is connected to the terminal BT which is connected to the centre winding of the relay A through relay contacts $G_2$.

A source (not shown) of dialling tone is connected to the terminal DT which is connected through relay contacts $F_1$ to the centre winding of the relay A.

When the calling unit is not in use there is no earth on the terminal $PO_1$, the contacts $B_1$ being open. The absence of an earth on this terminal serves to indicate to a searching subscribers line circuit that the calling unit is available for use. When the calling unit is seized by the subscribers line circuit current flows from earth through the left-hand winding of the relay windings A, through the relay contact $D_1$, through the calling subscriber's line, back through the relay contacts $D_2$, through the right-hand winding A and through the battery $BAT_3$ to earth. Thus the relay A operates and its contacts $A_1$ and $A_2$ close.

The contacts $A_2$ apply an earth to the cathode of the gas-filled triode $V_2$, and hence prepare this valve for later operation.

The contacts $A_1$ complete the circuit of the relay winding B the circuit being from earth through the battery $BAT_9$ through the winding B and the contacts $A_1$ to earth. The relay contacts $B_1$ to $B_5$ close. The contacts $B_1$ apply an earth to the terminal $PO_1$ thus indicating to any further searching subscriber's line circuit that the calling unit is engaged. The contacts $B_2$ prepare a circuit for transmitting subsequent dialling impulses to the terminal IMP. The contacts $B_3$ connect the terminal $P_1$ to the contacts $E_3$ and thence through the left-hand relay winding E to the negative terminal of the battery $BAT_6$. The contacts $B_4$ put an earth on the busbar $BUS_1$. The contacts $B_5$ connect the terminal GP to the suppressor grids of the two valves $V_4$ and $V_5$.

It is assumed that the seized calling unit terminates channel No. 1. The high-frequency pulses $d_0$ and $u_1$ from the pulse generator 14 of Figure 1 are therefore applied to the calling unit at $Td_0$ and $Tu_1$ from the terminals of like reference in Figure 1. The rectifier $W_{66}$ provides a low impedance path for all of each $d_0$ pulse applied to the terminal $Td_0$ except that part thereof which occurs during a $u_1$ pulse. The $u_1$ pulses render the rectifier non-conducting. Thus during the absence of the $u_1$ pulse the $d_0$ pulse applied to the terminal $Td_0$ is dropped across the resistor $R_{179}$. During each $u_1$ pulse coincident with a $d_0$ pulse, however, voltage is passed to the terminal GP.

The voltage pulses appearing at the terminal GP are arranged to be positive-going. The negative bias applied to the suppressor grids of the two pentodes $V_4$ and $V_5$ is arranged to be sufficient to render these two valves normally non-conducting. The amplitude of the voltage pulses applied to the suppressor grids of the two pentodes $V_4$ and $V_5$ from the terminal GP is arranged to be sufficient to overcome the bias and to render these two valves conducting. Thus the valves $V_4$ and $V_5$ are gated in channel No. 1, and unmodulated pulses in channel No. 1 are transmitted from the anode of $V_4$, through the capacitor $C_5$ to the terminal $GSP_1$.

The earth applied to the terminal $A_1$ through contacts $B_4$, the busbar $BUS_1$ and the contacts $E_2$ is for the purpose of allotting the register to the calling unit as described in co-pending patent application No. 257,786. When the register is allotted the terminal $P_1$ becomes earthed through the register and hence the relay E becomes energised. The contacts $E_1$ are hold-on contacts and are arranged to close before any other contacts of the relay E. Operation of the relay contacts $E_2$ and $E_3$ serves to release the allotter as described in co-pending patent application No. 257,786. The contacts $E_4$ complete a circuit from earth through the contacts $A_1$, $E_4$ and $D_5$ to the terminal HO. The earth and the terminal HO serve to hold the allotted register as described in copending patent application No. 257,786. The contacts $E_5$ connect the charged capacitor $C_{12}$ to the control grid of the valve $V_2$ which therefore strikes and energises the relay winding F. The contacts $F_1$ close and hence dialling tone is fed to the calling subscriber's line through the winding of the relay A and the calling subscriber's line circuit.

The contacts $E_6$ connect the terminals $Td'_0$ and $Tu'_1$ to the terminal $Rd'u'$. The low frequency pulses $d'_0$ and $u'_1$ are applied to the terminals $Td'_0$ and $Tu'_1$ respectively and hence appear at the terminal $Rd'u'$.

These low frequency pulses are employed in the exchange to identify to the called subscriber the channel number of the calling unit seized by the calling subscriber. In this example the low frequency pulses indicate that channel No. 1 has been seized.

When the calling subscriber dials the number he requires the dialling impulses operate the relay A, one operation of the relay A occurring for each dialling impulse. The operation of the contacts $A_1$ serves to transmit corresponding impulses to the terminal IMP which is connected to the allotted register.

When the called unit 16 (Figure 1) seized by the called subscriber's line circuit is set up in the identified channel (channel No. 1 in this example) pulses are transmitted from the called unit through the metering and release junction 19 (Figure 1) to the terminal $ASPO_1$ in Figure 2. Each of these pulses renders the rectifier $W_7$ non-conducting and hence the pulses appearing in channel No. 1 at the terminal GP are permitted to pass to the control grid of the valve $V_6$. This valve then passes pulses of anode current through the relay winding D which becomes energised.

The contacts $D_1$ and $D_2$ operate and reverse the polarity of the terminals $+O_1$ and $-O_1$. This is for signalling purposes as described on page 278 of Telephony vol. II by Atkinson. The contacts $D_4$ apply a pulse of current to the terminal $PO_1$ from the battery $BAT_{10}$, the relay contacts $J_1$ being operated after the contacts $D_4$ on de-energisation of the slow operating relay J by the opening of the contacts $D_3$.

The pulse of current applied to the terminal $PO_1$ serves to operate the meter in the subscriber's line circuit as described in co-pending application No. 257,786. The contacts $D_5$ open and hence remove the earth from the terminal HO. Thus the register is released.

Speech voltages from the calling subscriber's station are transmitted through the transformer $HY_1$ to the control grid of the valve $V_4$ and there amplitude-modulate the pulses in channel No. 1 applied to the terminal GP. These amplitude-modulated pulses pass through the go speech junction to the called units.

Return speech appears in the form of modulated pulses in channel No. 1 at the terminal $RSPO_1$ and are applied to the control grid of the pentode $V_5$ which is gated by pulses in channel No. 1 applied to the suppressor grid from the terminal GP.

The transformer $XF_1$ in the anode circuit of the valve $V_5$ together with the capacitors $C_7$ and $C_{10}$, the resistors $R_7$ and $R_{195}$ and the rectifiers $W_3$ to $W_6$ serve to broaden the pulses passed by the valve $V_5$ and hence facilitate demodulation. The broadened modulated pulses are passed through the valve $V_3$ and are demodulated by a low-pass filter $FIL_1$. The speech voltages are applied through the transformer $HY_1$ and the calling subscriber's line circuit to the calling subscriber's line.

It is arranged that in the event of the called subscriber being engaged an earth appears on the terminal $BU_1$ as described in co-pending patent application No. 257,786. The earth on the terminal $BU_1$ causes the relay G to become operated. The contacts $G_1$ hold the relay G and the contacts $G_2$ apply the busy tone to the calling subscriber's line through the relay winding A and the calling subscriber's line circuit.

When a call is ended and the calling subscriber replaces his handset on its rest the energising circuit for the relay A is broken. The relay contacts $A_1$ return to their unoperated position, thus de-energising the relay B. The contacts $B_1$ remove the earth from the terminal $PO_1$ which results in the release of the calling unit.

Although an arrangement has been described in which the reply pulses appear at the terminal $ASPO_1$ it will be appreciated that the reply pulses may be transmitted through the return speech junction by making the reply pulses of opposite polarity to the speech pulses. The reply pulses can then readily be distinguished from the speech pulses and susbequently caused to operate the relay $D_5$.

We claim:

1. In an automatic exchange having a plurality of stations, a plurality of pairs of lines, each said pair of lines including an incoming line and an outgoing line, each said pair of lines having a different time displaced pulse characteristic and a register for locating a called station: a channel terminating unit for a pair of lines, said unit comprising a first input terminal for connection to a calling station, a second input terminal for connection to a source of time displaced gating pulses characteristic of the line to which the unit is connected, a third input terminal for connection to the incoming line of said pair of lines, said incoming line having modulated time displaced pulse signals, a first output terminal for connection to the register, a second output terminal for connection to the outgoing line of said pair of lines, means for applying impulses to the first output terminal upon the application to the first input terminal of pulses from a calling station, a first gate device, a second gate device, circuit means connecting the second input terminal to both said gate devices so as to open said gate devices only when predetermined time displaced gating pulses characteristic of said pair of lines are applied to the second input terminal, circuit means for applying speech and the like signals received from a calling station at the first input terminal to the first gate device and through said device to the second output terminal, circuit means for applying modulated time displaced incoming speech pulses appearing at the third input terminal to the second gate device to be gated by the said gating pulses, a pulse demodulator, circuit means connecting the output of the second gate device to the input of the pulse demodulator, and circuit means connecting the output of the pulse demodulator to the first input terminal.

2. A channel terminating unit as set forth in claim 1 wherein the means for applying impulses to the first output terminal upon the application to the first input terminal of pulses from a calling station comprises a relay including an energizing means and contacts, the energizing means being connected to the first input terminal and the contacts being connected to the first output terminal.

3. A channel terminating unit as set forth in claim 1 wherein each gate device comprises an electron discharge tube having an anode, a cathode, a control grid, a screen grid and a suppressor grid, wherein the gating pulses appearing at the second input terminal are applied to the suppressor grids of both tubes, wherein the means for applying speech and the like signals to the first gating device comprises a hybrid transformer having a secondary winding connected between the control grid and the cathode of the tube forming the first of the gate devices, and wherein the means for applying pulses appearing at the third input terminal to the second gate device comprises a circuit for applying the modulated time displaced incoming speech pulses to the control grid of the tube forming the second gate device.

4. A channel terminating unit as set forth in claim 1 wherein the pulse demodulator comprises a pulse lengthening circuit and a low-pass filter.

5. A channel terminating unit as set forth in claim 1 wherein there are provided a fourth terminal, a relay indicating that a reply signal has been received, said relay being operable by reply signals in the form of pulses of the same phase as those characterizing the pair of lines to which the channel terminating unit is connected, and a circuit means for applying the reply signals to said relay for energizing the same.

6. A channel terminating unit as set forth in claim 5 wherein the reply signals are in the form of pulses coincident with the gating pulses and the means for applying the reply signals to the relay constitutes a gate device which is gated by said gating pulses.

7. A pulse channel terminating unit for use in an electronic telephone exchange, comprising a speech and signalling voltage terminal, a pulse modulator, a connection from said speech and signalling voltage terminal to said pulse modulator, a gating pulse input terminal connected to said modulator, a speech pulse output terminal, a connection from said modulator to said speech pulse output terminal, a speech pulse input terminal, a pulse gate, a connection from said speech pulse input terminal to said gate, a connection from said gating pulse input terminal to said gate to gate the speech pulses from said speech pulse input terminal, a speech pulse demodulator, a connection from the output of said gate to said speech pulse demodulator, a connection from the output of said demodulator to said speech and signalling voltage terminal, a signalling voltage regenerator, a connection from said speech and signalling voltage terminal to said signalling voltage regenerator, a signalling voltage output terminal, and a connection from the output of said signalling voltage regenerator to said signalling voltage output terminal.

8. A pulse channel terminating unit as claimed in claim 7, wherein said signalling voltage regenerator comprises a delay connected to be energized by signalling voltage applied thereto and having contacts connected to said signalling voltage output terminal.

9. A pulse channel terminating unit as claimed in claim 7, comprising a signalling reply pulse terminal, a further gate, a connection from said signalling reply pulse terminal to said further gate, a connection from said gate pulse input terminal to said further gate to gate signalling pulses applied thereto from said signalling reply pulse terminal, and means responsive to signalling reply pulses passed by said further gate to disconnect said signalling voltage regenerator from said signalling voltage output terminal.

References Cited in the file of this patent

UNITED STATES PATENTS

| | | |
|---|---|---|
| 2,289,528 | Taylor et al. | July 14, 1942 |
| 2,490,833 | Ransom | Dec. 13, 1949 |
| 2,541,932 | Melhose | Feb. 13, 1951 |
| 2,559,603 | Derjavitch | July 10, 1951 |
| 2,583,711 | Scowen | Jan. 29, 1952 |
| 2,619,548 | Lesti | Nov. 25, 1952 |
| 2,666,809 | Flowers | Jan. 19, 1954 |
| 2,683,771 | Ridlington | July 13, 1954 |
| 2,695,333 | Harper | Nov. 23, 1954 |
| 2,708,220 | Levy | May 10, 1955 |